(12) United States Patent
Serniuck et al.

(10) Patent No.: US 7,291,298 B2
(45) Date of Patent: Nov. 6, 2007

(54) APPARATUS AND METHOD FOR INJECTION MOLDING SHOOTING POT WEDGE FEATURE

(75) Inventors: Nicholas W. Serniuck, Oakville (CA); Roberto D. Sicilia, Mississauga (CA)

(73) Assignee: Husky Injection Molding Systems Ltd. (CA)

( * ) Notice: Subject to any disclaimer, the term of this patent is extended or adjusted under 35 U.S.C. 154(b) by 665 days.

(21) Appl. No.: 10/887,353

(22) Filed: Jul. 9, 2004

(65) Prior Publication Data

US 2006/0006563 A1 Jan. 12, 2006

(51) Int. Cl.
  *B29C 45/13* (2006.01)
  *B29C 45/54* (2006.01)
(52) U.S. Cl. .................. 264/40.1; 264/328.8; 425/130; 425/558
(58) Field of Classification Search ............... 264/40.1, 264/328.8; 425/130, 549, 558, 557
See application file for complete search history.

(56) References Cited

U.S. PATENT DOCUMENTS

| | | | |
|---|---|---|---|
| 2,770,011 A | 11/1956 | Kelly | |
| 4,095,931 A | 6/1978 | Reitan | |
| 4,717,324 A | 1/1988 | Schad | |
| 4,966,545 A | * 10/1990 | Brown et al. | ................ 425/557 |
| 6,228,309 B1 | * 5/2001 | Jones et al. | ............. 264/328.8 |
| 6,491,509 B1 | * 12/2002 | Schad et al. | ................ 425/130 |
| 2004/0217499 A1 | * 11/2004 | Manigatter et al. | ........ 264/40.1 |

* cited by examiner

*Primary Examiner*—Jill L. Heitbrink
(74) *Attorney, Agent, or Firm*—Katten Muchin Rosenman LLP

(57) ABSTRACT

An injection molding shooting pot shot size control apparatus is configured to be installed in a coinjection hot runner with a coinjection nozzle, the coinjection nozzle having at least two melt channels ending at the same gate includes a valve inlet and a valve outlet. An adjustable melt control mechanism, preferably in the form of a hydraulically actuated wedge, is configured to (i) be disposed in a cavity plate adjacent to a hot runner assembly, and allow the shot size position to be set while the mold is open, and (ii) permit the charged shooting pot cylinder to decompress the melt when the wedge is pulled away from the shooting pot piston.

24 Claims, 4 Drawing Sheets

APPARATUS AND METHOD FOR INJECTION MOLDING SHOOTING POT WEDGE FEATURE

BACKGROUND OF THE INVENTION

1. Field of the Invention

The present invention relates to a shooting pot shot size control feature incorporated within a cavity plate adjacent to a coinjection hot runner assembly in an injection molding machine, and in particular to an apparatus and method where a transverse-acting adjustable mechanical stop means is used to control the shot size of one of the shooting pots. Preferably, the shot size control is provided by a hydraulically actuated wedge structure that also allows the shooting pot to be charged while the mold is open.

2. Description of Related Art

Coinjection molding is typically used to mold multi-layered plastic packaging articles having a laminated wall structure. Each layer is typically passed through a different annular or circular passageway in a single nozzle structure and each layer is partially, sequentially, injected through the same gate. Some coinjection hot runner systems include shooting pots to meter material of one plastic resin so that each cavity of a multi-cavity mold receives an accurate dose of that resin in the molding cycle. Some design configurations use check valves to prevent backflow of the resin when the shooting pot discharges the resin through the nozzle.

U.S. Pat. No. 2,770,011 to Kelly teaches a hot runner valve gated mold in which the valve stems are opened and closed by an hydraulically actuated wedge shaped mechanism.

U.S. Pat. No. 4,095,931 to Reitan teaches a hot runner valve gated mold in which spool like shaft is moved axially to provide a camming action to cause the closing of the valve stems. Plastic pressure causes the valves stems to open at the appropriate time in the molding cycle.

U.S. Pat. No. 4,717,324 to Schad teaches a coinjection hot runner system including shooting pots that are activated hydraulically. The pistons are all oriented in the same direction so that the hydraulic actuation can be housed in the machine's stationary platen, or as taught in U.S. Pat. No. 6,152,721 to Schad, behind the stationary platen alongside the injection units.

In the configuration of the present invention, some of the shooting pot pistons are oriented toward the mold's parting line, and consequently their control becomes more problematic and cannot be accomplished by the configurations taught in the above art. Thus, what is needed is a shooting pot shot size control feature that allows for better shot control even when the parting line is open, permits more precise shot size metering, accommodates melt decompression, and allows for pullback prior to filling the shooting pots.

SUMMARY OF THE INVENTION

It is an advantage of the present invention to overcome the problems of the related art and to provide shooting pot adjustable shot size control method and apparatus whereby shot metering is provided throughout the molding cycle.

According to a first aspect of the present invention, a unique combination of structure and/or steps is provided for an injection molding shooting pot assembly shot size controller configured to be installed in a coinjection hot runner with a coinjection nozzle, the coinjection nozzle having at least two melt channels ending at the same gate. The shot size controller includes a shooting pot piston, the position of said shooting pot piston within a shooting pot cylinder defining the shot size, and a transverse-acting adjustable stop means having an angled surface disposed adjacent to the shooting pot piston, where movement of the angled surface adjusts the position of the shooting pot piston.

According to a second aspect of the present invention, a unique combination of structure and/or steps is provided for an injection molding shooting pot assembly shot size controller configured to be installed in a coinjection hot runner with a coinjection nozzle, the coinjection nozzle having at least two melt channels ending at the same gate. The structure comprises an inlet melt channel, an outlet melt channel configured to provide melt to the coinjection nozzle, a shooting pot cylinder disposed between the inlet melt channel and the outlet melt channel, and a shooting pot piston configured to move within the shooting pot cylinder to discharge melt from the shooting pot cylinder to the outlet melt channel. A shot size controller disposed adjacent the shooting pot piston, and having an angled surface configured to adjust shot size in response to displacement of the shot size controller relative to the shooting pot piston.

According to a third aspect of the present invention, a unique combination of structure and/or steps is provided for an injection mold including a mold cavity, and a coinjection nozzle configured to inject a melt into the mold cavity, the nozzle having at least two melt channels ending at the same gate. An outlet melt channel is configured to carry melt to the nozzle. Also provided are a shooting pot piston, a shooting pot cylinder configured to discharge melt to the outlet melt channel upon activation of said shooting pot piston, and an inlet melt channel configured to carry melt to the shooting pot cylinder. A shot size controller is disposed adjacent to the shooting pot piston, and has an angled surface configured to adjust shot size in response to displacement of the shot size controller relative to the shooting pot piston.

According to a fourth aspect of the present invention, a unique combination of structure and/or steps is provided for controlling shot size in a shooting pot assembly in a coinjection hot runner with a coinjection nozzle, the coinjection nozzle having at least two melt channels ending at the same gate. A wedge is provided having a an angled surface disposed adjacent to a shooting pot piston. The wedge is actuated substantially perpendicularly with respect to an end of the shooting pot piston, thereby displacing the shooting pot piston within a shooting pot cylinder and adjusting the shot size.

BRIEF DESCRIPTION OF THE DRAWINGS

Exemplary embodiments of the presently preferred features of the present invention will now be described with reference to the accompanying drawings.

DETAILED DESCRIPTION OF THE PRESENTLY PREFERRED EXEMPLARY EMBODIMENTS

1. INTRODUCTION

The present invention will now be described with respect to embodiments in which shooting pot shot size control is provided via a hydraulically actuated structure, preferably in the form of a wedge. The shot size control structure is preferably located in the cavity plate adjacent to the shooting pot of a plastic coinjection molding machine to control the shot size of one of the shooting pots, and to allow the pot to be charged while the injection mold is open. The coinjection process according to the present invention partially injects a first material through the gate, followed by partially injecting a second material through the same gate.

This invention is related to inventions disclosed in several copending U.S. patent applications, including U.S. patent application Ser. No. 10/879,576 entitled INJECTION MOLDING MACHINE SHOOTING POT WITH INTEGRAL CHECK VALVE U.S. patent application Ser. No. 10/879,581 entitled; INJECTION MOLDING MACHINE SPIGOTITED SHOOTING POT PISTON; U.S. patent application Ser. No. 10/879,621 entitled APPARATUS AND METHOD FOR SEALING INJECTION UMT ANT) SPRUE; U.S. patent application Ser. No. 10/879,575 entitled APPARATUS AND METHOD FOR ACTUATION OF INJECTION MOLDING SHOOTING POTS; U.S. patent application Ser. No. 10/879,582 entitled CONTROL SYSTEM FOR A DYNAMIC FEED COINJECTION PROCESS; U.S. patent application Ser. No. 10/880,494 entitled HOT RUNNER COINJECTION NOZZLE WITH THERMALLY SEPARATED MELT CHANNELS; and U.S. patent application Ser. No. 10/880,493 entitled COINJECTION MOLDING COOLED SHOOTING POT CYLINDER. The contents of each of these related applications is incorporated herein by reference in their entirety.

2. THE STRUCTURE OF THE FIRST EMBODIMENT

Figure 1:
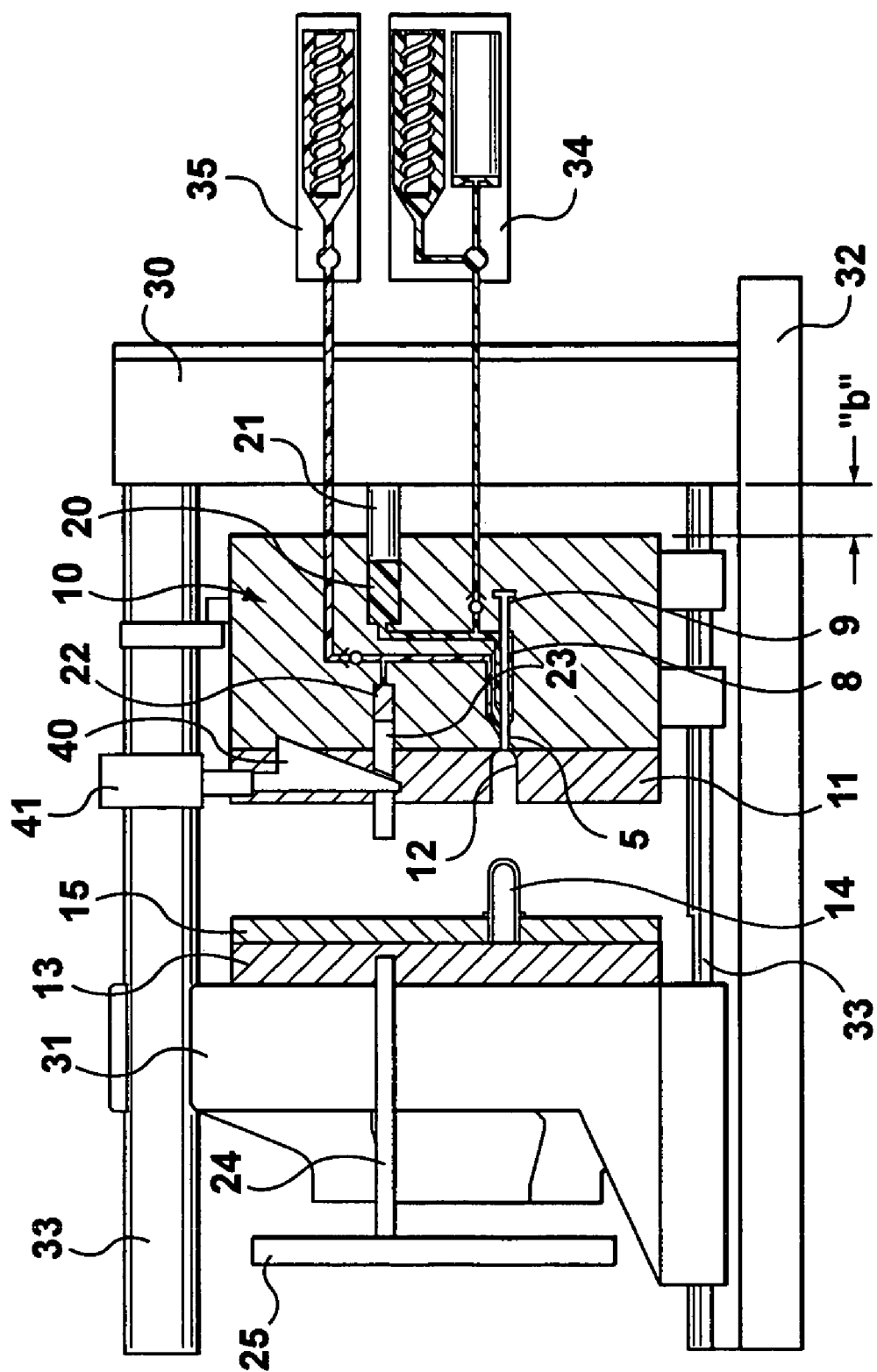
FIG. 1 is a schematic view of a coinjection hot runner molding system in the mold open position showing the preferred embodiment of the present invention.

FIG. 1 shows a schematic representation of a coinjection hot runner mold mounted in the clamp of a molding machine provided with two injection units. The mold comprises a movable hot runner assembly 10, attached to a cavity plate 11 containing a mold cavity 12, a core plate 13 upon which is mounted a core 14 and a stripper plate 15 for ejection of the molded article off the core. The movable hot runner assembly 10 includes a cylinder 8 having a valve stem 9 disposed therein for regulating the flow of melt to nozzle tip 5. The movable hot runner assembly 10 also includes a first shooting pot 20 for material "A" and a first shooting pot piston 21 that is attached to the machine's stationary platen 30. Also included is a second shooting pot 22 for material "C" and a second shooting pot piston 23, where centerline 43 indicates the axis through the center of the piston 23. Second shooting pot piston 23 is activated by control rod 24 that passes through the stripper plate 15, core plate 13 and the machine's moving platen 31 and is attached to movable plate 25 mounted behind the moving platen 31. The machine includes the aforementioned platens 30 and 31 that are mounted on a frame 32 and are guided in movement by tiebars 33. Also included are first injection unit 34 for plasticizing and injecting material "A" and second injection unit 35 for plasticizing and injecting material "C".

Also shown in FIG. 1 is the shot size control apparatus of the present invention. Shot size for second shooting pot 22 is controlled by the position of wedge 40 with respect to centerline 43 through shooting pot piston 23. The wedge 40 preferably moves substantially orthogonally with respect to the centerline (longitudinal axis) 43 of the shooting pot piston 23. The position of wedge 40 is adjusted by servo actuator 41. Wedge 40 can be used to set the shot size position (i.e., the back position of the second shooting pot piston 23) while the mold is in its open position. This is accomplished when the position of wedge 40 is adjusted by actuator 41 such that the wedge 40 moves toward the centerline 43 of second shooting pot piston 23, and the width of the wedge portion in contact with the second shooting pot piston 23 is increased, thereby pushing piston 23 inward within the shooting pot 22, toward stationary platen. 30, thereby decreasing the shot size available within second shooting pot 22. The movement of wedge 40 need only be very slight to accomplish this aspect of the present invention.

Use of wedge 40 in accordance with the present invention beneficially allows the shooting pot to be recharged with melt while the mold is in the open position. In addition, when wedge 40 is adjusted by actuator 41 such that the wedge 40 is moved away from the centerline 43 of second shooting pot piston 23, the width of the wedge portion in contact with the second shooting pot piston 23 is decreased, and the second shooting pot piston 23 is able to retract, thereby permitting the charged second shooting pot 22 to decompress. Retracting wedge 40 also allows melt "C" to be displaced from its melt channel so that melt "A" can enter the "C" melt channel. This ensures that no "C" melt will enter the mold cavity 12 with the "A" melt during the first injection operation. This feature is particularly useful for coinjection apparatus.

The wedge shape having an angled surface that contacts the piston is a particularly preferred embodiment of the shooting pot shot size adjusting apparatus according to the present invention. The wedge of the present invention may be formed of any material suitable for use in an injection molding environment, with tool steel being particularly preferred.

Figure 2:
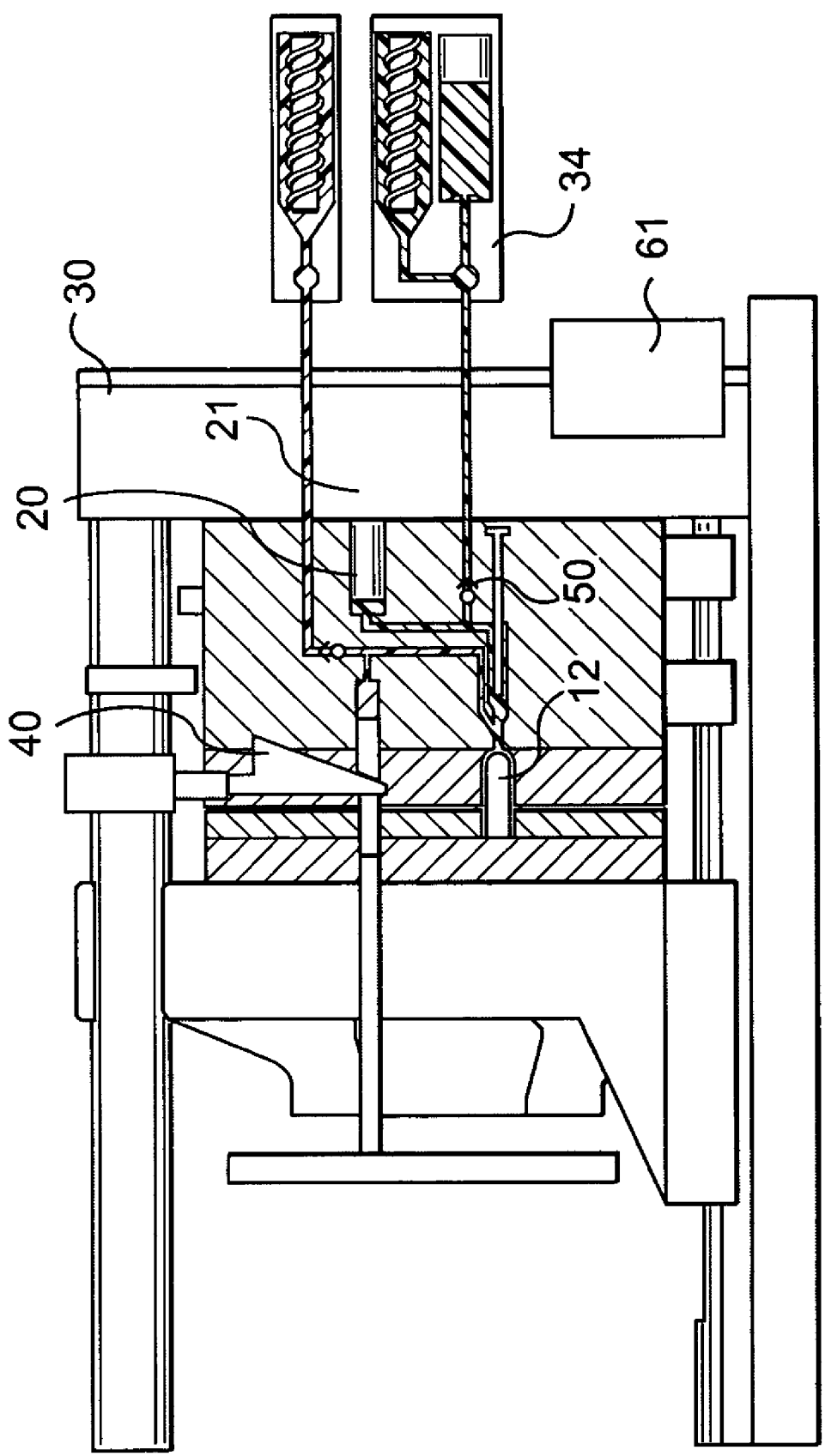
FIG. 2 is a schematic view of FIG. 1 showing the mold clamped position after the first injection of the "A" material.

FIG. 2 shows the mold in the closed position and immediately after the first shooting pot 20 has discharged its "A" material into the mold cavity 12. The first shooting pot piston 21 caused this displacement as the clamp moved the movable hot runner assembly 10 towards the stationary platen 30, thereby taking up substantially all of distance "b". Ball check valve 50 has prevented backflow of material "A" into the first injection unit 34 during this discharge operation.

Figure 3:
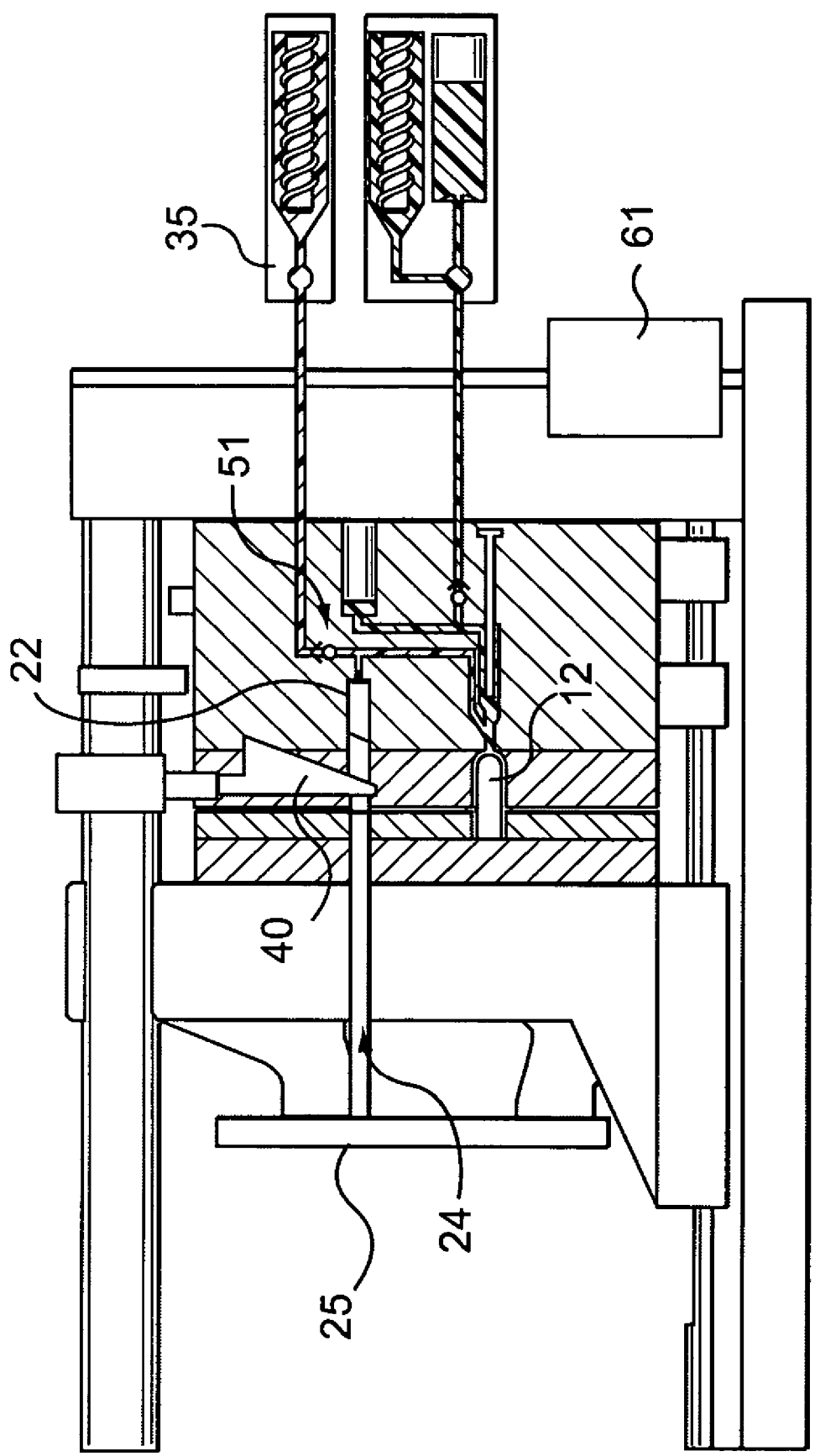
FIG. 3 is a schematic view of FIG. 1 showing the mold clamped position after the injection of the "C" material.

FIG. 3 shows the mold in the closed position and immediately after the second shooting pot 22 has discharged its "C" material into the mold cavity 12. The second shooting pot piston 23 was actuated by control rod 24 moved by plate 25. Ball check valve 51 has prevented backflow of material "C" into the second injection unit 35 during this discharge operation.

Figure 4:
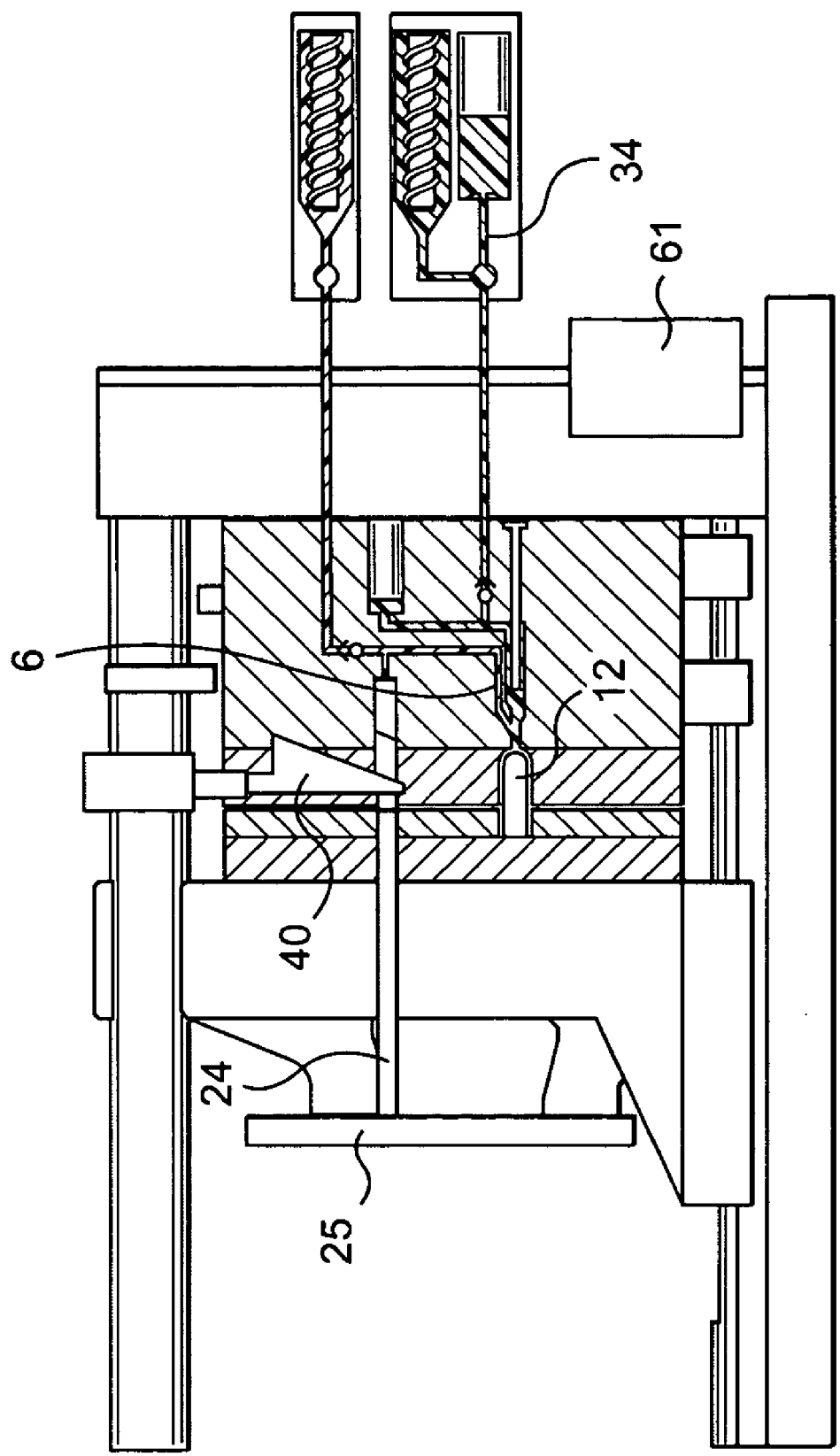
FIG. 4 is a schematic view of FIG. 1 in the mold clamped position after the second injection of the "A" material.

FIG. 4 shows the mold in the closed position and immediately after the first injection unit 34 has made its second feeding of material "A" into the mold cavity 12. A packing phase occurs after the mold cavity has been filled by this second feeding of the "A" resin. A packing pressure is applied to the melt in the filled cavity via resin "A" being pressurized by injection unit 34. During this phase, a slight retraction of plate 25 and rod 24 allows the "C" resin to backflow into its shooting pot as it is displaced by some "A"

resin moving into the "C" melt channel 6 at the nozzle tip 5. This ensures that at the beginning of the next molding cycle the first shot of the "A" resin will not contain any "C" resin that may otherwise have been drawn out of its channel as the "A" resin is fed into the mold cavity. Both shooting pots can be recharged during the subsequent remaining portion of the molding cycle while the part is cooling or being ejected with the mold closed or open as appropriate.

To control the movements of the various machine elements (e.g., the first and second injection units 33, 34, the servo actuator 41, the first and second shooting pot pistons 21, 23, etc.), any type of controller 61 or processor may be used. For example, one or more general-purpose computers, Application Specific Integrated Circuits (ASICs), Digital Signal Processors (DSPs), gate arrays, analog circuits, dedicated digital and/or analog processors, hard-wired circuits, etc., may receive input and provide output to the various controllable components described herein. Instructions for controlling the one or more of such controllers or processors may be stored in any desirable computer-readable medium and/or data structure, such floppy diskettes, hard drives, CD-ROMs, RAMs, EEPROMs, magnetic media, optical media, magneto-optical media, etc.

3. THE METHOD OF THE PRESENT INVENTION

FIG. 1 shows the mold in the open position in which the part can be ejected off the core. In operation, the shooting pots are shown as charged with their respective materials. The shot sizes in the respective shooting pots are controlled by the back positions of the shooting pot pistons. The shot size of shooting pot 20 for the "A" material is controlled by the distance "b" that the movable hot runner assembly 10 has moved away from the stationary platen 30. The shot size of the shooting pot 22 for the "C" material is controlled by the position of wedge component 40 with respect to centerline 43 of second shooting pot piston 23, where the wedge component 40 is moved vertically by servo actuator 41. This feature allows the shot size position, or back position of the shooting pot piston 23 to be set while the mold is open, thereby allowing the shooting pot to be recharged during this part of the molding cycle if required.

Further, in operation, the wedge 40 can slightly pull away from the centerline 43 of shooting pot piston 23 to allow the charged shooting pot cylinder 22 to decompress the melt. Prior to refilling the shooting pot, the wedge 40 can be retracted to relax the melt in the "C" nozzle channel 6 to allow a small amount of "A" material to enter the "C" nozzle channel as shown in FIG. 1. This ensures that at the beginning of the next molding cycle when the "A" material is inject there is no risk of "C" material being drawn from the "C" nozzle channel 6 to enter the mold cavity 12 with the "A" material during the first shot. (This process is more clearly defined in copending U.S. patent application Ser. No. 10/879,582 entitled CONTROL SYSTEM FOR A DYNAMIC FEED CO-INJECTION PROCESS, the contents of which are incorporated herein by reference in their entirety.)

4. CONCLUSION

The shot size adjusting apparatus and method of the present invention permit the advantageous configuration of mold design in which the shooting pots for different materials are oriented to operate in opposite directions when discharging their contents. This configuration allows them to be positioned in the hot runner assembly so that they occupy the least amount of space. In this example the first and second shooting pots are aligned coaxially, one behind the other, thereby minimizing the width and height of the mold assembly containing them. This arrangement allows the mold design to accommodate the maximum number of mold cavities for a given size part diameter and also optimizes the mold shoe sizes. Further, since preform molds typically require less clamp tonnage than is normally provided for a given platen area, this means that in some cases a smaller sized machine clamp can be used for a specific mold cavitation and perform size. This optimization of sizing reduces both capital cost of the equipment and its operating cost.

Advantageous features according to the present invention may include:

In a coinjection hot runner assembly, the sliding melt control provides precise, dynamic shot size metering.

The melt control apparatus allows for pullback prior to the filling of the shooting pot.

The melt channel can be decompressed.

The use of the melt control means allows for total shot size control, even when the parting line is open and the "C" push rods are decoupled.

Thus, what has been described is a method and apparatus for efficiently providing an adjustable mechanical stop means to control the shot size of a shooting pot assembly, that additionally provides reduced space requirements, and decreases assembly and maintenance costs.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. patent documents discussed above are hereby incorporated by reference into the Detailed Description of the Preferred Embodiment.

What is claimed is:

1. A method for controlling shot size in a shooting pot assembly in a coinjection hot runner with a coinjection nozzle, the coinjection nozzle having at least two melt channels ending at the same gate, comprising the steps of:
   providing a wedge having an angled surface disposed adjacent to a shooting pot piston; and
   actuating said wedge substantially perpendicularly with respect to an end of said shooting pot piston, thereby displacing said shooting pot piston within a shooting pot cylinder and adjusting said shot size.

2. The method of claim 1, wherein said step of actuating said wedge is accomplished via a hydraulic actuator.

3. The method claim 1, wherein when the wedge is moved towards a centerline of said shooting pot piston, said shot size decreases.

4. The method of claim 1, wherein when the wedge is moved away from a centerline of said shooting pot piston, said shot size increases.

5. The method of claim 1, wherein when the wedge is moved away from a centerline of said shooting pot piston, melt contained in the shooting pot is decompressed.

6. An injection molding shooting pot assembly shot size controller configured to be installed in a coinjection hot runner with a coinjection nozzle, the coinjection nozzle having at least two melt channels ending at the same gate, comprising:
   a shooting pot piston, the position of said shooting pot piston within a shooting pot cylinder defining the shot size; and
   a transverse-acting adjustable stop means having an angled surface disposed adjacent to said shooting pot piston, where movement of said angled surface adjusts the position of said shooting pot piston.

7. A shot size controller according to claim 1, wherein said transverse-acting adjustable stop means is configured to be disposed within a mold structure adjacent the shooting pot assembly.

8. A shot size controller according to claim 1, further comprising a servo actuator, and wherein said actuator moves the transverse-acting adjustable stop means substantially perpendicularly with respect to the shooting pot piston.

9. The injection molding shooting pot assembly of claim 1, wherein when the transverse-acting adjustable stop means is moved toward a centerline of said shooting pot piston, the shot size decreases.

10. The injection molding shooting pot assembly of claim 1, wherein when the transverse-acting adjustable stop means is moved away from a centerline of said shooting pot piston, the shot size increases.

11. The injection molding shooting pot assembly of claim 1, wherein when the transverse-acting adjustable stop means is moved away from a centerline of said shooting pot piston, melt contained in the shooting pot is decompressed.

12. The injection molding shooting pot assembly of claim 1, wherein the transverse-acting adjustable stop means comprises a wedge.

13. An injection molding shooting pot assembly shot size controller configured to be installed in a coinjection hot runner with a coinjection nozzle, the coinjection nozzle having at least two melt channels ending at the same gate, comprising:
    an inlet melt channel;
    an outlet melt channel configured to provide melt to the coinjection nozzle;
    a shooting pot cylinder disposed between said inlet melt channel and said outlet melt channel;
    a shooting pot piston configured to move within said shooting pot cylinder to discharge melt from said shooting pot cylinder to said outlet melt channel; and
    a shot size controller disposed adjacent said shooting pot piston, and having an angled surface configured to adjust shot size in response to displacement of said shot size controller relative to said shooting pot piston.

14. The injection molding shooting pot assembly of claim 13, wherein said displacement of said shot size controller is accomplished using a hydraulic actuator.

15. The injection molding shooting pot assembly of claim 13, wherein the shot size controller is a wedge.

16. The injection molding shooting pot assembly of claim 13, wherein when the shot size controller is moved toward a centerline of said shooting pot piston, said shot size decreases.

17. The injection molding shooting pot assembly of claim 13, wherein when the shot size controller is moved away from a centerline of said shooting pot piston, said shot size increases.

18. The injection molding shooting pot assembly of claim 13, wherein when the shot size controller is moved away from a centerline of said shooting pot piston, melt contained in the shooting pot is decompressed.

19. An injection mold, comprising:
    a mold cavity;
    a coinjection nozzle configured to inject a melt into said mold cavity, the nozzle having at least two melt channels ending at the same gate;
    an outlet melt channel configured to carry melt to said nozzle;
    a shooting pot piston;
    a shooting pot cylinder configured to discharge melt to said outlet melt channel upon activation of said shooting pot piston;
    an inlet melt channel configured to carry melt to said shooting pot cylinder; and
    a shot size controller disposed adjacent to said shooting pot piston, and having an angled surface configured to adjust shot size in response to displacement of said shot size controller relative to said shooting pot piston.

20. The injection mold of claim 19, wherein said displacement of said shot size controller is accomplished using a hydraulic actuator.

21. The injection mold of claim 19, wherein the shot size controller is a wedge.

22. The injection mold of claim 19, wherein when the shot size controller is moved toward a centerline of said shooting pot piston, the shot size decreases.

23. The injection mold of claim 19, wherein when the shot size controller is moved away from a centerline of said shooting pot piston, the shot size increases.

24. The injection mold of claim 19, wherein when the shot size controller is moved away from a centerline of said shooting pot piston, melt contained in the shooting pot is decompressed.

* * * * *